United States Patent Office 3,436,421
Patented Apr. 1, 1969

3,436,421
SYNTHESIS OF DEHYDROIONONE
Ralph Lawrence Rowland, Winston-Salem, N.C., assignor to R. J. Reynolds Tobacco Company, Winston-Salem, N.C., a corporation of New Jersey
No Drawing. Continuation-in-part of application Ser. No. 440,601, Mar. 17, 1965. This application Mar. 14, 1967, Ser. No. 622,934
Int. Cl. C07c 49/44
U.S. Cl. 260—587     3 Claims

ABSTRACT OF THE DISCLOSURE

Method of synthesizing dehydroionone wherein α-ionone is halogenated in the presence of a tertiary amine and the halogenated material is then dehydrohalogenated to form dehydroionone.

---

This application is a continuation-in-part of my co-pending application Ser. No. 440,601 filed Mar. 17, 1965, now abandoned.

This invention relates to a new method for synthesizing dehydroionone.

As disclosed in the copending application, Ser. No. 283,970 filed May 29, 1963, now Patent No. 3,211,157 by Ralph L. Rowland, dehydroionone is utilized as a starting material for the preparation of 4-(2-butenylidene)-3,5,5-trimethyl-2-cyclohexan-1-one, which compound is useful in tobacco for enhancing the flavor and aroma thereof.

It is a principal object of the present invention to provide a new synthesis method for dehydroionone.

A further object of the present invention is to provide a new, simplified synthesis method for dehydroionone, which method affords high yield of the desired product having a high purity and is readily carried out utilizing available reactants and in such manner that the various reaction steps are easily controlled.

In accordance with the present invention, α-ionone is reacted, in the presence of a tertiary amine, with a halogen to form a halogenated reaction product, which by dehydrohalogenation yields the desired dehydroionone.

Bearing in mind that explanation of chemical reactions is not required in a patent application and without intending to be bound by any theoretical explanation, it can be postulated that the reactions involved in this new synthesis proceed as follows:

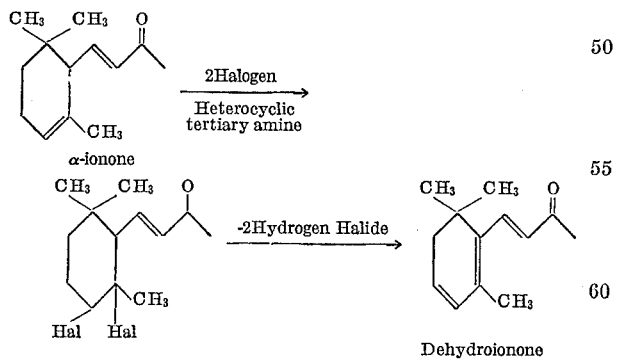

Halogenation of the α-ionone is accomplished utilizing a halogenating agent such as bromine or chlorine in an inert reaction solvent and in the presence of a tertiary amine. Any inert reaction solvent which does not interfere with the reaction can be suitably employed, representative of such solvents being chloroform, carbon tetrachloride and the like.

The temperature employed for the halogenation reaction is not critical and the halogenation can be carried out over a wide temperature range, ranging from temperatures well below 0° to elevated temperatures. However, optimum yields are generally obtained when the halogenation is effected at temperatures within the range of −15 to +30° C.

The presence of a tertiary amine and preferably a heterocyclic tertiary amine during the halogenation reaction is important. These amines are preferably employed in molar amounts equivalent to or greater than the α-ionone. Suitable tertiary amines for use in the invention are, for example, quinoline, 2,6-lutidine, triethylamine, 2,4-lutidine, 2-ethylpyridine, 3,4-dimethylpyridine, 3,5-dimethylpyridine, 4-ethylpyridine, gamma-picoline, 2,4,6-trimethylpyridine, 5-ethyl-2-methylpyridine, pyridine and the like.

After formation of a halogenated product the desired dehydroionone is obtained by dehydrohalogenation thereof. Preferably, the inert reaction solvent is removed prior to the dehydrohalogenation which can be accomplished by heating the said halogenated product to temperatures within the range from about 90° C. to 100° C. in the presence of a suitable dehydrohalogenating agent. Suitable dehydrohalogenating agents include, for example, N,N-dimethylaniline, quinoline, N,N-diethylaniline and the like.

Detailed descriptions of the synthesis of the present invention are as follows, utilizing bromine as a representative halogenating agent.

Example I

To a mixture of 41.5 milliliters (0.2 mole) of commercial α-ionone (85% α-ionone, 15% β-ionone), 30 milliliters (0.25 mole) of quinoline, and 250 milliliters of chloroform, cooled in an ice-calcium chloride bath, a mixture of 11 milliliters (0.21 mole) of bromine and 90 milliliters of chloroform was added dropwise with stirring over a period of 1.2 hours. The reaction mixture was concentrated under reduced pressure.

To the residue was added 50 milliliters of N,N-dimethylaniline. The mixture was heated in a boiling water bath for three hours. Pyridine (10 milliliters) was added and heating was continued for 0.5 hour. To the cooled reaction mixture were added 400 milliliters of pentane and 200 milliliters of 5 N hydrochloric acid. The aqueous layer was extracted with 300 milliliters of pentane. The combined pentane extracts were washed with two 100-milliliter portions of 5 N hydrochloric acid and with 100 milliliters of 5% sodium bicarbonate solution. The dried solution was chromatographed using alumina. Those chromatographic fractions showing infrared absorption indicative of dehydroionone were analyzed by vapor phase chromatography, with such analyses indicating a yield of 15.5 grams (41%) of dehydroionone.

Example II

The procedure of Example I was repeated except that equivalent molar amounts of bromine, quinoline and α-ionone were employed instead of an excess of the bromine and quinoline as previously. Thus, 0.17 mole of quinoline and 0.17 mole of bromine were used. Vapor phase chromatographic analysis of the final product showed a yield of 21 grams of dehydroionone or 65% based on pure α-ionone.

Example III

The procedure of Example I was repeated except that in place of the quinoline, 23 milliliters (0.21 mole) of 2,6-lutidine were used and 10 milliliters (0.195 mole) of bromine were employed. Seventeen (17.0) grams of dehydroionone were obtained corresponding to a 45% yield.

Example IV

To a mixture of 41.5 milliliters (0.2 mole) of commercial α-ionone (80% α-ionone, 20% β-ionone), 23 milliliters (0.2 mole) of quinoline, and 200 milliliters of chloroform at room temperature, a mixture of 9.0 milliliters (0.17 mole) bromine and 90 milliliters of chloroform was added dropwise with stirring over a period of 6 hours. After 0.5 hour, 50 milliliters of dimethylaniline was added and the chloroform was removed from the mixture under reduced pressure.

The concentrate was heated in a boiling water bath for three hours. To the cooled reaction mixture were added 500 milliliters of ether and 300 milliliters of 5 N hydrochloric acid. The aqueous layer was extracted with an additional 300 milliliters of ether. The combined ether extracts were washed with three 200-milliliter portions of 5 N hydrochloric acid and with 200 milliliters of 5% sodium bicarbonate solution. The ether layer was dried for two hours over 150 grams alumina. Vapor-phase chromatographic analysis and liquid column chromatographic analysis of the residue obtained by concentration of the ether solution showed that the product contained 14.6 grams dehydroionone, 7.3 grams α-ionone, and 4.7 grams β-ionone, corresponding to a dehydroionone yield of 48% based on the amount of starting α-ionone or a dehydroionone yield of 63% with allowance for the recovered α-ionone.

Example V

The procedure of Example IV was repeated except that the bromine-chloroform mixture was added over a period of 8 hours to the ionone-quinoline-chloroform mixture which was warmed in a water bath held at 49–52° C. The reaction product contained 13.55 grams dehydroionone (45% yield based on the quantity of starting α-ionone) and 15.0 grams α-ionone (49% of the starting α-ionone).

Example VI

The procedure of Example IV was repeated with the difference that the quinoline was replaced by 28 milliliters of triethylamine. The reaction gave a 14% yield of dehydroionone with a high recovery of unreacted α-ionone.

Example VII

The procedure of Example IV was repeated except that the quinoline was replaced by 26 milliliters of 2,4,6-trimethylpyridine and that the bromine-chloroform mixture was added during a period of 2.5 hours to the ionone-chloroform-2,4,6-trimethylpyridine mixture which was heated in an oil bath at 70° C.; the reaction gave a 24% yield of dehydroionone and a 33% recovery of α-ionone.

Example VIII

The procedure of Example IV was repeated except that the quinoline was replaced by 27 milliliters of 5-ethyl-2-methylpyridine and the 80% α-ionone was replaced by 41.5 milliliters pure α-ionone. The reaction gave a 41% yield of dehydroionone and a 36% recovery of α-ionone.

Example IX

The procedure of Example IV was repeated except that the quinoline was replaced by 32 milliliters of pyridine and that the 80% α-ionone was replaced by 41.5 grams pure α-ionone. The reaction gave an 18% yield of dehydroionone and a 26% recovery of α-ionone.

I claim:

1. A process for preparing dehydroionone which comprises reacting a halogen consisting of chlorine or bromine with α-ionone in the presence of a tertiary amine at a temperature in the range from about −40° to +75° C. to form a halogenated reaction product and then, dehydrohalogenating in the presence of an amine, said reaction product to form dehydroionone.

2. The process of claim 1 wherein a heterocyclic tertiary amine is employed in the halogenation step.

3. A process for preparing dehydroionone which comprises reacting a halogen consisting of chlorine or bromine with α-ionone within a temperature range of about −40° to +75° C. in an inert solvent and in the presence of a tertiary amine to form a halogenated product, removing said inert solvent and then dehydrohalogenating in the presence of an amine said reaction product to form dehydroionone.

References Cited

UNITED STATES PATENTS

| | | | |
|---|---|---|---|
| 2,871,267 | 1/1959 | Petracek et al. | 260—586 |
| 3,355,506 | 11/1967 | Di Bella | 260—648 |

OTHER REFERENCES

Domnin, "Chem Abst." vol. 46, col. 6092d (1952).

BERNARD HELFIN, *Primary Examiner.*

MATTHEW M. JACOB, *Assistant Examiner.*